Aug. 21, 1928.　　　　　　　　　　　　　　　　　　　1,681,303

M. H. MARTIN

SIDE FRAME FOR CAR TRUCKS

Filed July 19, 1926

Inventor
Mark H. Martin

By
John W. Darley
Attorney

Patented Aug. 21, 1928.

1,681,303

UNITED STATES PATENT OFFICE.

MARK H. MARTIN, OF BALTIMORE, MARYLAND, ASSIGNOR TO T. H. SYMINGTON & SON, INC., OF BALTIMORE, MARYLAND, A CORPORATION OF MARYLAND.

SIDE FRAME FOR CAR TRUCKS.

Application filed July 19, 1926. Serial No. 123,377.

My invention relates to side frames for car trucks.

One object of my invention is to devise a side frame provided with a load carrying spring construction which is energy absorptive in nature and therefore particularly adapted for preventing, or largely neutralizing, the roll of a car body.

A further object is to devise a side frame having a spring construction of the character described, whose vertical travel is longer than present standard types, thereby maintaining contact of the wheels and rails, when the engagement between a rigid car body and its truck occurs off the center of the car, on track that is excessively out of surface.

A further object is to devise a side frame which is arranged to prevent the transmission of uncushioned shocks through the truck parts to the rails at loads now permitting such action in the art.

A further object is to devise a side frame having a spring construction including helical springs in which failure of said springs is largely obviated through reduction of their normal working range.

A further object is to devise a side frame provided with auxiliary spring means, having one period of oscillation, arranged in series with existing types of springs, which have a different period of oscillation, thereby breaking up synchronization of the last named springs with the rail joints and thus eliminating the timed car roll and vertical jiggle of the springs.

My improved side frame is particularly directed towards solving the problem of freight car derailment, both through preventing the roll of high capacity, high gravity cars and also the unloading of the wheels at one corner of a rigid type of car when moving over a track which is excessively out of surface. In present construction, car bodies are supported on helical springs which, since they have a straight line action in compression and release, permit a rolling of the body with a pendulum action, the timing of which is constant and independent of the amplitude of the roll. At certain definite speeds, dependent upon the design and lading factors of the car, the timing of this roll synchronizes with the regular intervals of the rail joints. Where the joints are out of surface, the effect becomes cumulative and the roll of the body is increased at this synchronizing speed, due to the impulses reacted by the depressions at the rail joints.

When traversing curves, this rolling may become so excessive as to cause a pivoting of the truck on the treads of the inner wheels, with a consequent lifting of the outer forward wheel flange above the top surface of the outer rail, thus causing derailment. A further disadvantageous effect of this cumulative roll, whether on curved or straight track, is the compression of the truck springs into a solid body, an action which not only transmits destructive, uncushioned shocks through the truck elements to the rails with obvious results, but, through setting up a hightly localized bending moment in some portion of the coil, frequently causes a failure of the spring. In addition, it is apparent that, since the present truck spring is often worked through a range from no load to a load that will close it solid, it either becomes subject to failure through fatigue, or acquires a permanent set which impairs its usefulness.

In order to solve the foregoing problem, it is my intention to associate with the standard A. R. A. helical spring, a spring of higher capacity having friction, or work absorbing, characteristics. Preferably, the units of this spring assembly are arranged to function in series. Therefore, when compressed by the roll of the car body, the spring assembly in releasing does not return as much energy thereto as it received initially and consequently, it exerts a damping effect on the tendency of the body to roll. Rolling is accordingly either entirely prevented, or is reduced to a minimum. As a further result of this construction, it is obvious that since the car roll is eliminated, or materially reduced, the working range of the helical spring is correspondingly reduced and as a corollary thereto, the spring will not go solid. Uncushioned shocks are therefore prevented, the higher capacity, work absorbing spring permitting these shocks only at loads greatly in excess of those now causing such action in the present spring.

For the purpose of meeting the second cause of derailment, adverted to above, the combined travel of the spring assembly just described is made longer than that of the standard A. R. A. spring. Therefore, the tendency, in rigidly constructed box cars for the load to be removed from the wheels at one corner of the car on a track excessively out of surface, is overcome, since the longer travel of the spring construction assures that such wheels will always be loaded.

It is to be understood that the foregoing spring arrangement is disclosed as being merely the preferred construction, as it is contemplated that other than the standard A. R. A. spring may be used and that the work absorptive spring may have a different relative capacity than that already discussed.

These and other arrangement

These and other improvements in side frame design, considering the frame proper and/or its allied parts, will be set forth in the following specification, reference being had to the accompanying drawing, and the novel means by which said objects are effectuated will be definitely pointed out in the claims.

Figure 1:
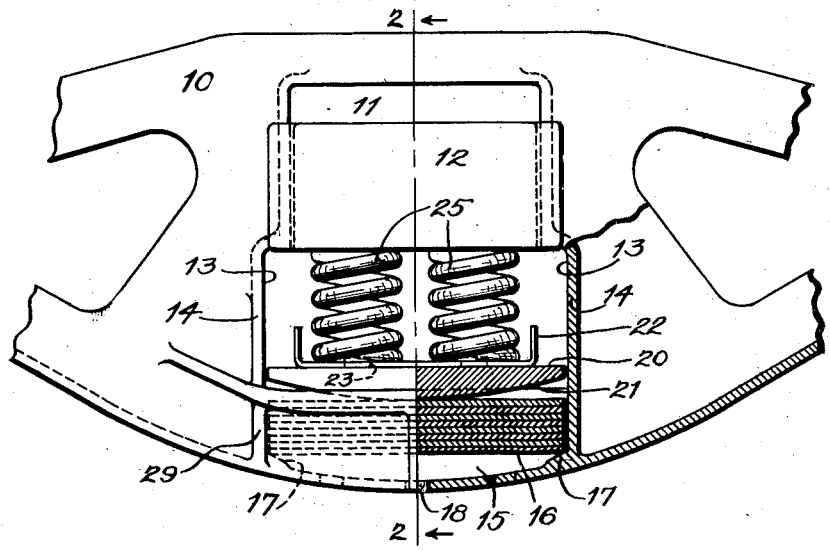
Fig. 1 is a side elevation, partly in section, of my improved side frame and its coacting bolster.

The numeral 10 represents a side frame having a window opening 11 for the operative reception of one end of a truck bolster 12, the sides of said opening being defined by columns 13—13 whose sectional area is increased by ribs 14—14 for a purpose hereinafter explained. Said frame is arranged to be interchangeable with the standard A. R. A. frame, the portions thereof which engage with the journal boxes not being shown, since the latter are not comprised within the scope of my invention.

A pocket 15 is formed in the lower portion of the frame 10 between the columns 13—13 and a laminated spring 16 is mounted on its end edges on shoulders 17—17 formed on the floor of said pocket. One or more drain holes 18 may be formed in said floor for the purpose of cleaning said pocket of refuse and water. The ends of said spring are preferably carried relatively close to the columns 13—13 for a purpose hereinafter explained and the sides thereof are guided by the side walls 19—19 of the pocket 15, said walls extending above the upper surface of said spring.

A follower block 20 having a convex under surface 21 rests on the upper surface of the spring 16 and the sides thereof are guided by the walls 19—19. Sufficient clearance is allowed between the ends of said block and the columns 13 to meet the operative requirements of said block.

One end of a spring plank 22 is mounted on the block 20 and the other end thereof extends across the truck, not shown, and is mounted upon a similar block, also not shown. Engagement between said plank and block may be secured by a plurality of lugs 23, preferably four in number, which extend from said block through suitable openings formed in said plank. Normally, the plank 22 is disposed above the horizontal bearing portions 24—24 on the frame 10, the interval being substantially equal to or greater than the maximum deflection of the spring 16 for a purpose hereinafter explained.

Springs 25 of any character or design, but preferably the standard A. R. A., helical spring for this type of service, are interposed between the plank 22 and the under side of the bolster 12. It will therefore be apparent that the laminated spring 16, block 20, plank 22 and helical springs 25 comprise an assembly which is adapted for compression and release when actuated by said bolster in the usual manner, the spring 16 preferably having a higher capacity than the springs 25. From their arrangement in the frame 10, it will be obvious that the springs of both types are arranged to function in series, the total travel of the assembly at any instant being dependent upon the individual travel of the separate springs.

Under operating conditions, if the car body is given a rolling impulse, the spring assembly on one side frame will be compressed, but since one of the units of that assembly possesses energy absorptive characteristics, it will be readily understood that less energy is returned to the body when the assembly is released than was imparted thereto initially. Accordingly, a damping action is exerted by my construction which is very advantageous for the purpose of controlling car roll and preventing its frequent concomitant factor, derailment.

Since the spring 16 has a higher capacity than the springs 25, the assembly possesses a considerably greater load carrying ability than present standard constructions. Loads, which now cause a solid closing of the helical springs with destructive results, may be safely carried by my improved frame by reason of the higher capacity of the spring 16. Failure of the helical springs is therefore largely prevented, as well as the transmission of uncushioned shocks through the truck parts to the rails, thus relieving side frames, bolsters, axles, wheels, rails, etc., of excessive loadings. Beneath the maximum load of the spring 16, it will be obvious that the coils of the springs 25 may be closed on each other without fatiguing results, since a measure of resiliency remains in another element, said spring 16, of the assembly. Moreover, since a solid closing of the springs 25 is largely prevented, it will be apparent that the working range of said springs is accordingly reduced and their useful life correspondingly increased.

Figure 4:
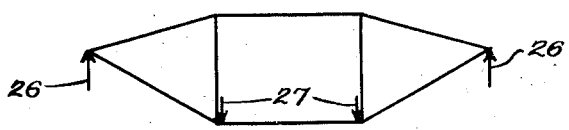
Fig. 4 is a diagrammatic representation of the side frame showing the points of application of the vertical forces thereto.

The purpose of disposing the end edges of the spring 16 close to the columns 13 is to reduce materially the bending moments in the portion of the frame beneath the window opening 11 and to carry the load in tension through said columns, the ribs 14 and 29, which are aligned, being provided to increase the sectional area of said columns for strengthening. The application of the vertical loads to the frame is clearly shown in Fig. 4, the arrows 26 denoting the reactions at the journal boxes and the arrows 27 the reactions on the shoulder 17. Since the spring 16 is carried on two points, graphically considered, it may flex therebetween under variations in the load, the upper leaf thereof being bowed into contact with varying areas of the convex under surface of the block 20. During this functioning, the rockable mounting of said block on said spring serves to equalize the load on the springs 25 in the event of any tendency to unequally load the same. If the load should become sufficiently large to entirely compress the spring assembly, the spring plank 22 may then contact with the bearing portions 24, if desired, since said plank can be normally disposed thereabove a distance equal to the maximum deflection of the spring 16. The load will then be transmitted directly to the frame. However, as pointed out above, this condition obtains only at loads greatly in excess of those which now close the standard springs solid. In addition, it will be understood that when compressed to its maximum extent, the portions of the spring 16 between the ends thereof will not bear against the floor of the pocket 15, since the load on said spring is always carried by the shoulders 17.

The preferred arrangement, however, comprehends that clearance will exist between the underside of the spring plank 22 and the portions 24 when the spring 16 has been deflected through its allowable travel, governed by the curvature of the follower 20. In this instance, the spring 16 and follower 20 act as a beam and transmit the entire reaction at the shoulders 17—17, thus reducing to an absolute minimum the bending in that portion of the side frame under the window opening 11 and between the columns 13.

The rockable mounting of the block 20 on the spring 16, as disclosed, is intended to be representative of equivalent arrangements for obtaining the same result. As an example, it is contemplated that said block may comprise a flat undersurface resting on a laminated spring which is bowed upwardly. This construction has not been illustrated as it is deemed to constitute a mere reversal of the parts of my preferred structure and accordingly is included within the scope of the pertinent claims appended hereto.

As will now be understood, my improved arrangement permits the obtention of a longer travel spring construction than that present in existing types, since to the travel of the standard spring is added the deflection of the spring 16. Accordingly, this device is particularly advantageous for use with rigidly constructed types of cars where track conditions are poor. The longer travel of the spring assembly assures that all wheels will be loaded even though the rails are excessively out of surface.

A further advantage of this construction is the reduction in wear between the truck bolster and frame through controlling the oscillations of the helical springs by the work absorbing spring 16. All of the improvements hereinbefore noted have been comprised within a frame which is interchangeable with present standard types, permitting its ready substitution in the event of failure.

Figure 3:
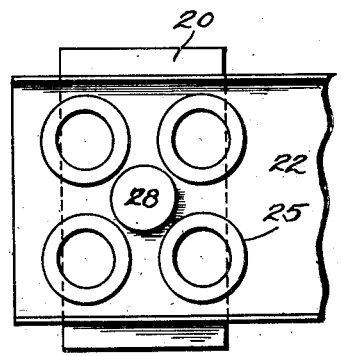
Fig. 3 is a plan view showing an alternative mode of connecting the spring plank and side frame.
Figure 2:
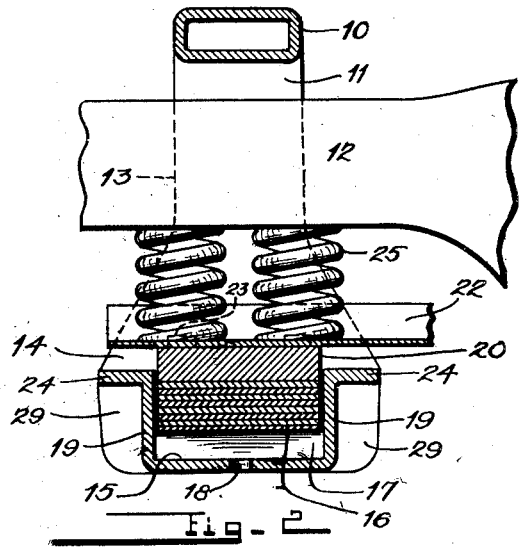
Fig. 2 is a section along the line 2—2 in Fig. 1, looking in the direction of the arrows.

The modification, illustrated in Fig. 3, shows a flexible connection between the plank 22 and block 20 by means of the lug 28, similar to the lugs 23. The remaining construction is identical with that already described.

It has been proposed heretofore to place the spring 16 in the truck bolster, but I have ascertained that an arrangement according to the present disclosure, possesses one advantage in particular. A longer laminated spring, with a correspondingly greater deflection, may be utilized by reason of the larger available space and consequently, a more versatile construction may be obtained.

In the claims, the term "spring", unless modified to indicate a specific type, is intended to denote elements of this character in general, whether of a helical construction or otherwise.

While I have shown one set of elements and combinations thereof for effectuating my improved frame, it is to be understood that I do not desire to be limited to the exact forms and structures shown, as the same is for the purpose of illustration only, for many changes may be made therein without departing from the spirit of my invention.

I claim:

1. A side frame comprising a pocket provided with a drain hole and a spring assembly composed of associated springs and a laminated spring mounted in said pocket and arranged for engagement with a truck bolster.

2. A side frame comprising a pocket and a spring assembly composed of associated springs and a laminated spring arranged for engagement with a truck bolster, said laminated spring having a different capacity from said first named springs and carried on the floor of said pocket, and said first named springs being mounted above said laminated spring.

3. In a car truck, the combination with a bolster, of a side frame provided with spaced columns defining an opening for the operative reception of said bolster and two sides of a pocket formed in the lower portion of said frame, and associated springs and a laminated spring interposed between said bolster and frame, said laminated spring being carried on the floor of said pocket and said first named springs being mounted above said laminated spring.

4. In a car truck, the combination with a bolster, of a side frame provided with spaced columns defining an opening for the operative reception of said bolster and two sides of a pocket formed in the lower portion of said frame, and associated springs and a laminated spring interposed between said bolster and frame, said laminated spring being carried on the floor of said pocket at points adjacent said pocket sides and said first named springs being mounted above said laminated spring.

5. In a car truck, the combination with a bolster, of a side frame provided with spaced columns defining an opening for the operative reception of said bolster and two sides of a pocket formed in the lower portion of said frame, and associated springs and a laminated spring interposed between said bolster and frame, said laminated spring being carried on the floor of said pocket at points relatively close to said pocket sides and said first named springs being mounted above said laminated spring.

6. In a car truck, the combination with a bolster, of a side frame operatively connected thereto, associated springs and a laminated spring interposed between said bolster and frame, said first named springs being mounted above said laminated spring, and means interposed between said first named and laminated springs adapted to equalize the load on said first named springs.

7. In a car truck, the combination with a bolster, of a side frame operatively connected thereto, associated springs and a laminated spring interposed between said bolster and frame, said first named springs being mounted above said laminated spring, and a follower block rockably disposed between said first named and laminated springs adapted to equalize the load on said first named springs.

8. In a car truck, the combination with a bolster, of a side frame operatively connected thereto, associated springs and a laminated spring interposed betwen said bolster and frame, said first named springs being mounted above said laminated spring, and a follower block rockably mounted on said laminated spring, and interposed between said first named and laminated springs, said block being adapted to equalize the load on said first named springs.

9. In a car truck, the combination with a bolster, of a side frame operatively connected thereto and having a pocket formed in the lower portion thereof, a laminated spring carried on the floor of said pocket, and a follower block and springs successively interposed between said laminated spring and bolster, said block having a convex under surface in engagement with said laminated spring.

10. In a car truck, the combination with a bolster, of a side frame operatively connected thereto and having a pocket formed in the lower portion thereof, a laminated spring carried on the floor of said pocket at separated points thereof, and a follower block and springs successively interposed between said laminated spring and bolster, said block having a convex under surface in engagement with said laminated spring and said laminated spring being adapted to engage with said floor at said separated points.

11. In a car truck, the combination with a bolster, of a side frame operatively connected thereto and having a pocket formed in the lower portion thereof, an assembly comprising a laminated spring, follower block, spring plank and springs interposed between the floor of said pocket and said bolster, said last named and laminated springs being arranged to normally maintain said plank free of engagement with said frame, and to permit contact of said plank therewith when fully compressed.

12. In a car truck, the combination with a bolster, of a side frame operatively connected thereto and having a pocket formed in the lower portion thereof, a laminated spring carried on its end edges at separated points on the floor of said pocket, a follower block, spring plank and springs successively interposed between said laminated spring and bolster, said last named and laminated springs being adapted to normally maintain said plank free of engagement with said frame and to permit contact of said plank therewith when fully compressed, and the intermediate portion of said laminated spring standing free of said floor when said plank contacts with said frame.

13. In a car truck, the combination with a bolster, of a side frame operatively connected thereto and having a pocket formed in the lower portion thereof, an assembly comprising a laminated spring, follower block, spring plank and springs interposed between the floor of said pocket and said bolster, said last named and laminated springs being arranged to maintain said plank free of engagement with said frame.

14. In a car truck, the combination with a bolster, of a side frame operatively connected thereto and having a pocket formed in the lower portion thereof, a laminated spring carried on its end edges at separated points on the floor of said pocket, a follower block, spring plank and springs successively interposed between said laminated spring and bolster, said last named and laminated springs being adapted to maintain said plank free of engagement with said frame, and the intermediate portion of said laminated spring standing free of said floor.

15. In a car truck, the combination with a bolster, of a side frame operatively connected thereto, an assembly comprising a laminated spring, follower block, spring plank and springs interposed between said frame and bolster, and means for engaging said plank and block.

16. In a car truck, the combination with a bolster, of a side frame operatively connected thereto, an assembly comprising a laminated spring, follower block, spring plank and springs interposed between said frame and bolster, and means carried by said block for engaging with said plank.

17. In a car truck, the combination with a bolster, of a side frame operatively connected thereto, an assembly comprising a laminated spring, follower block, spring plank and springs interposed between said frame and bolster, and means for engaging said plank and block at a plurality of points.

18. In a car truck, the combination with a bolster, of a side frame operatively connected thereto, an assembly comprising a laminated spring, follower block, spring plank and springs interposed between said frame and bolster, and means carried by said block for engaging with said plank at a plurality of points.

19. In a car truck, the combination with a bolster, of a side frame provided with spaced columns defining an opening for the operative reception of said bolster and forming two sides of a pocket formed in the lower portion of said frame, a laminated spring carried on its end edges at points on the floor of said pocket relatively close to said pocket sides, a curved follower block, spring plank, and springs successively interposed between said laminated spring and bolster, said laminated spring being adapted to normally and finally maintain said spring plank free of engagement with said frame by limiting the downward movement of said plank through bending said laminated spring to conform to the curvature of said follower, and the intermediate portion of said laminated spring standing free of said pocket floor when said plank reaches its lowermost position.

20. In a car truck, the combination with a bolster, of a side frame provided with spaced columns defining an opening for the operative reception of said bolster and forming two sides of a pocket formed in the lower portion of said frame, and resilient means, adapted for actuation by said bolster, carried at separated points on the floor of said pocket relatively close to said pocket sides, said columns being ribbed from the lower ends thereof for a predetermined distance above said pocket.

21. In a car truck, the combination with a bolster, of a side frame provided with spaced columns defining an opening for the operative reception of said bolster and forming two sides of a pocket formed in the lower portion of said frame, and resilient absorptive means, adapted for actuation by said bolster, carried on the floor of said pocket at separated points relatively close to said pocket sides, said columns being ribbed from the lower end thereof for a predetermined distance above said pocket.

22. In a car truck, the combination with a bolster, of a side frame having an opening for the operative reception of said bolster and a pocket disposed beneath and communicating with said opening, said opening being defined by spaced columns and the compression and tension members of said frame and said pocket being formed within said tension member, resilient absorptive means mounted in said pocket, a follower block resting on said means and adapted for actuation by said bolster, said block being restricted to movement in a vertical plane by the sides of said pocket, and a spring plank secured to said block in a manner preventing relative horizontal movement.

23. In a car truck, the combination with a bolster, of a side frame provided with spaced columns defining an opening for the operative reception of said bolster, and associated springs and a laminated spring successively interposed between said bolster and frame, said laminated spring being carried on the floor of said opening and bridged between points adjacent said columns.

24. In a car truck, the combination with a bolster, of a side frame provided with spaced columns defining an opening for the operative reception of said bolster, and associated springs and a laminated spring successively interposed between said bolster and frame, said laminated spring being carried on the floor of said opening and bridged between points relatively close to said columns.

25. In a car truck, the combination with a bolster, of a side frame operatively connected thereto, associated springs and a laminated spring interposed between said bolster and frame, and means interposed between said associated springs and laminated spring adapted to equalize the load on said associated springs.

26. In a car truck, the combination with a bolster, of a side frame operatively connected thereto, associated springs and a laminated spring interposed between said bolster and frame, and a follower block rockably disposed between said associated springs and laminated spring adapted to equalize the load on said associated springs.

In testimony whereof, I affix my signature.

MARK H. MARTIN.